Oct. 29, 1946.  A. W. PRANCE  2,410,361
METHOD FOR MAKING PLASTIC ARTICLES
Filed Dec. 6, 1943  3 Sheets-Sheet 1
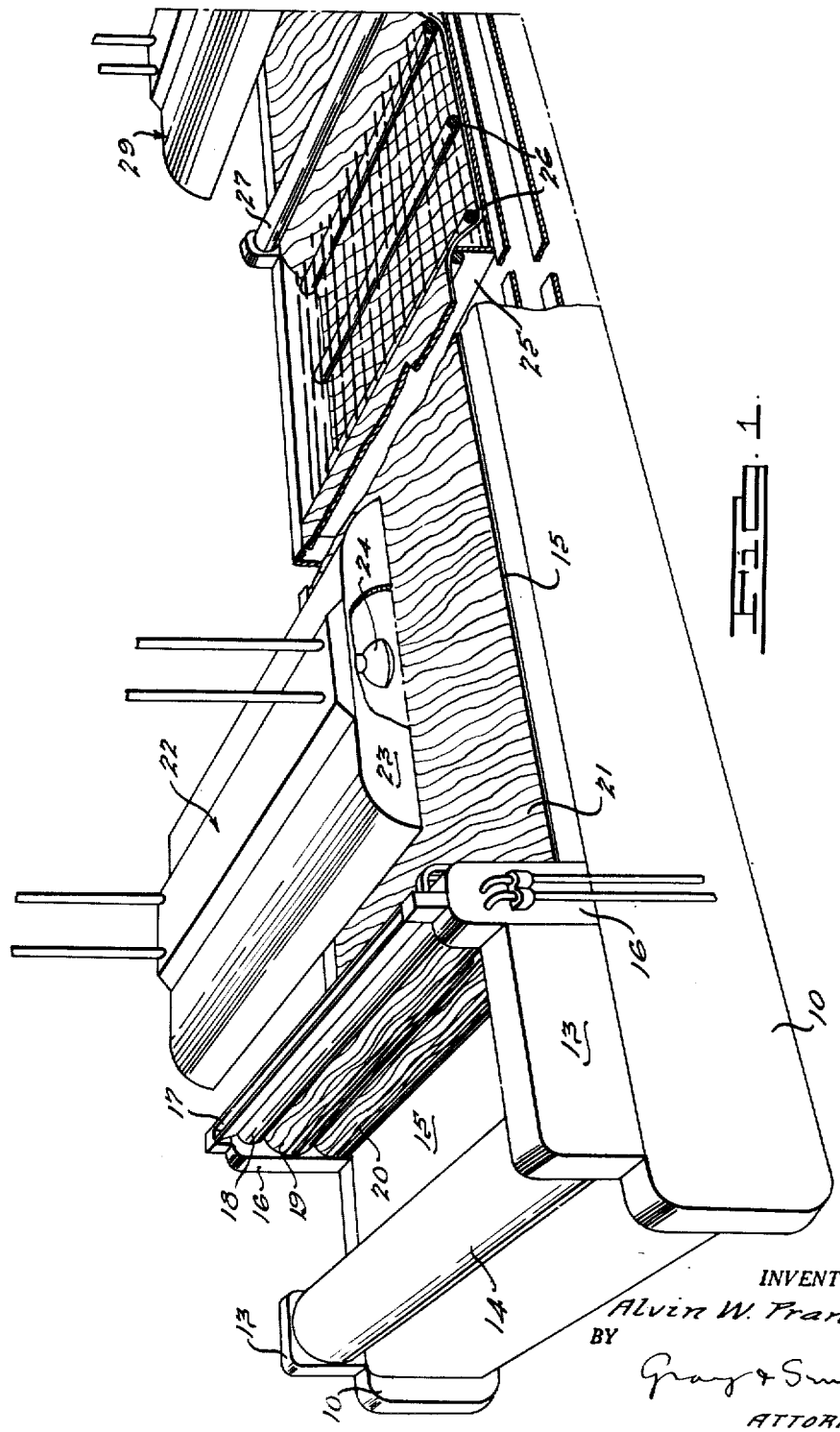
INVENTOR.
Alvin W. Prance.
BY
Gray & Smith
ATTORNEYS Oct. 29, 1946.     A. W. PRANCE     2,410,361
METHOD FOR MAKING PLASTIC ARTICLES
Filed Dec. 6, 1943     3 Sheets-Sheet 2
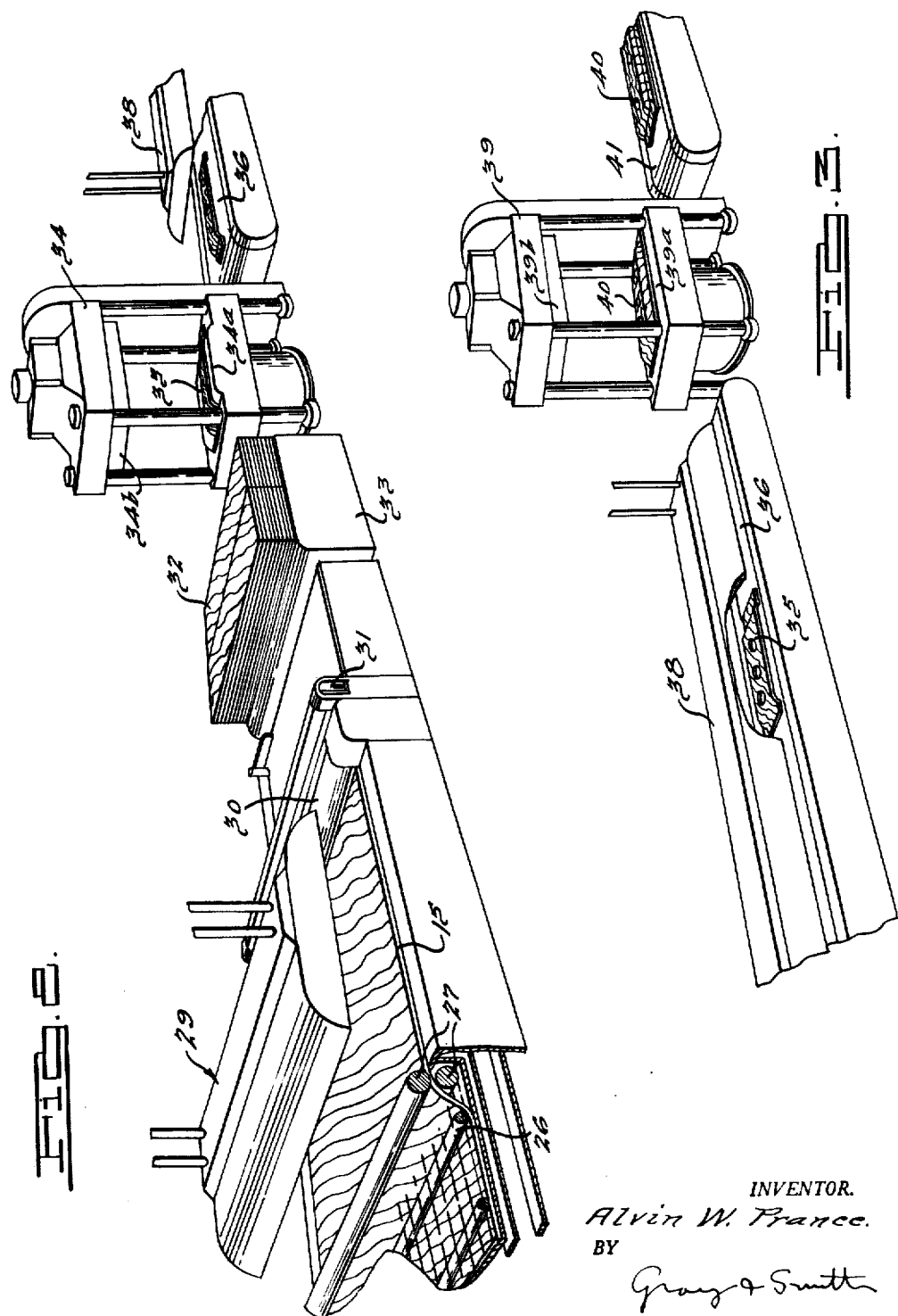
INVENTOR.
Alvin W. Prance.
BY
George & Smith
ATTORNEYS.

Oct. 29, 1946.    A. W. PRANCE    2,410,361
METHOD FOR MAKING PLASTIC ARTICLES
Filed Dec. 6, 1943    3 Sheets-Sheet 3
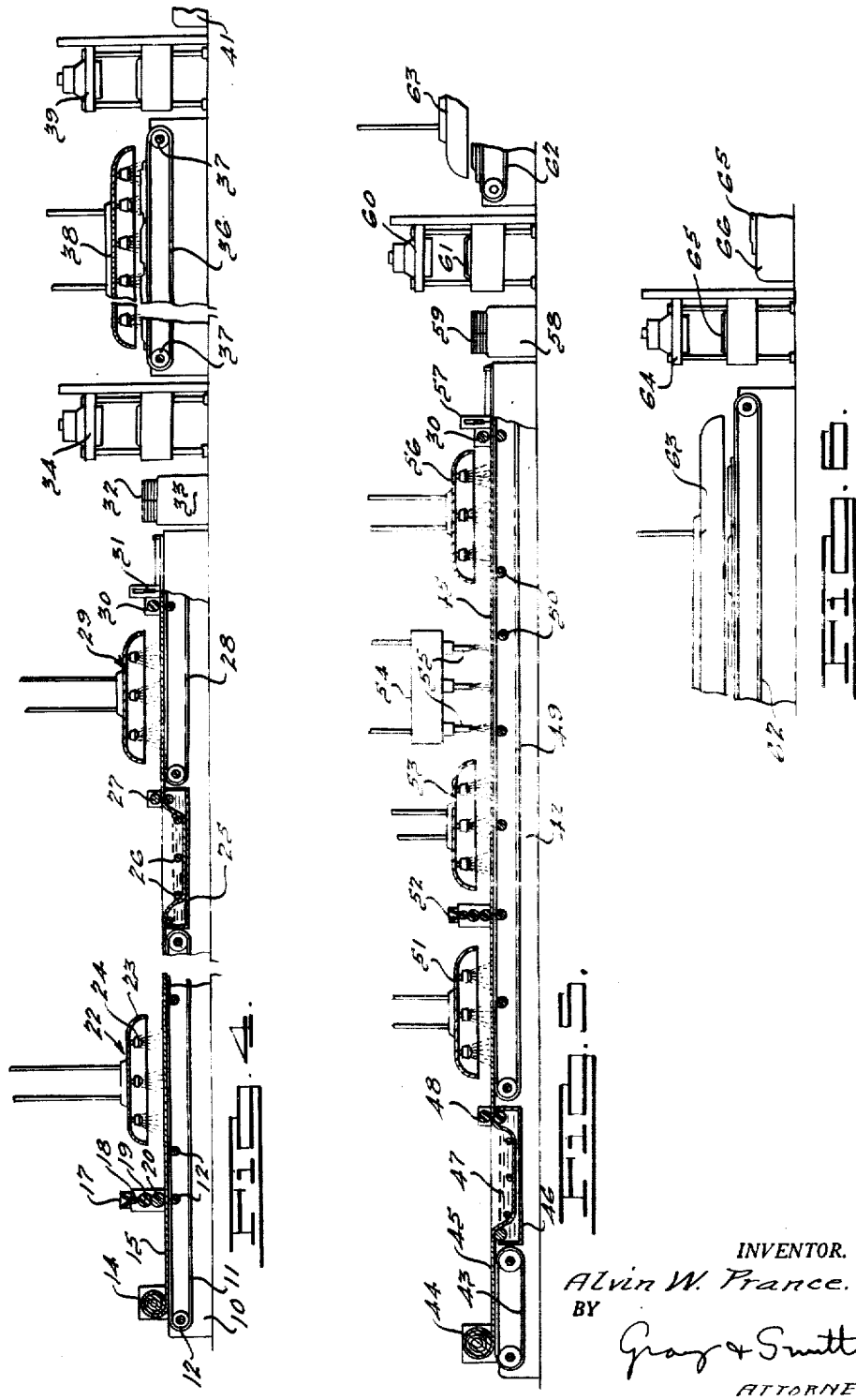
INVENTOR.
Alvin W. Prance.
BY
Gray & Smith
ATTORNEYS.

Patented Oct. 29, 1946

2,410,361

UNITED STATES PATENT OFFICE 2,410,361

METHOD FOR MAKING PLASTIC ARTICLES

Alvin W. Prance, Royal Oak, Mich., assignor to Briggs Manufacturing Company, Detroit, Mich., a corporation of Michigan Application December 6, 1943, Serial No. 513,080

12 Claims. (Cl. 18—47.5)

This invention relates to the fabrication of plastic articles and particularly articles prepared from materials in which the principal constituent is a resinous composition or substance of the thermosetting type, an important object of the invention being to produce an article from plastic materials carrying any predetermined design or pattern which will be permanent in nature, will remain relatively undistorted during forming operations, and will not readily become defaced or marred during use of the article.

In the manufacture of articles from sheet material containing a thermosetting resinous substance it has been the practice to form the sheet or blank into the desired shape by the application of heat and pressure, this being usually accomplished in a press having heated die members or platens. The resinous sheet or blank is introduced into the press when in an intermediate stage of polymerization and as the blank is shaped to form in the press it is heated to a temperature and during a period of time sufficient to complete the polymerization of the resin. In the fabrication of articles in this manner from resinous materials, it becomes frequently desirable to impart or apply to the surface of the article a design or ornamental pattern so as to enhance its appearance. It is usually desirable that the design or pattern be in color and it may take any form. As an illustration it may be desirable to produce an article, such as a panel, carrying an imitation wood graining pattern. In the present embodiment of the invention such a pattern is produced on the articles, although it will be understood that the invention is in nowise limited thereto.

Considerable difficulties have been encountered in producing articles from thermosetting resinous materials, which articles are provided with surface designs or patterns. One principal difficulty lies in maintaining the accuracy of the design, or fidelity of reproduction of a pattern, or distinctness and clarity thereof, on account of the tendency to change, distort or obliterate the design during the forming operations when the printed blanks are subjected to pressure and heat causing flow of the resin and polymerization thereof. Thus, where the resinous blank or sheet material is printed with the desired design or pattern and thereafter formed under heat and pressure, it frequently happens that the flow of resin will disturb the inked pattern and change, smudge or distort it and, in many instances, nearly obliterate it or at least render the pattern indistinct and of little ornamental value.

Another problem encountered with plastic articles carrying an inked pattern or design, resides in the fact that after usage of the article the design becomes marred, defaced or partially worn off, impairing the appearance of the article. One suggestion to overcome this difficulty has been to apply a thin coating or film of lacquer to the surface of the finally formed article. This has proved undesirable since the lacquer film readily wears off and does not materially protect the inked design or pattern against scratching or marring. Another suggestion has been to print the surface of the resinous blank and by heat and pressure forcing the resin, which must be of a transparent or clear nature, around and over the inked pattern to provide a layer of the resin covering the printing. This proposal, however, has encountered the difficulty of preventing the resin flowing to the surface around the inked pattern from distorting or disturbing the pattern since the resin, as it flows through and around the pattern, will dislodge and carry portions of the ink of the pattern with it. Avoidance of this difficulty, if possible, requires exceedingly precise and exact controls raising barriers to large scale production.

An object of the present invention is to eliminate the above mentioned difficulties or minimize them to an important extent so that articles of the kind herein contemplated may be produced with greater accuracy and permanency in respect to the patterns or designs carried thereby.

A further object of the invention is to provide a method whereby the printed or inked pattern on the article will not become appreciably distorted or impaired during the forming operation under heat and pressure.

Another object of the invention is to provide an improved method in which a thermosetting resinous article may be produced, carrying an inked or printed design or pattern which will be completely buried or enveloped in the surface resin while at the same time being maintained more nearly free of distortion or disturbance as a result of flowing of the resin during the forming operation.

Still a further object of the invention is to provide an improved method for forming a thermosetting resinous article carrying a printed design, characterized by the fact that the design is substantially fixed in position against disturbance or distortion during the forming operation when the resin is brought to a final stage of reaction or polymerization.

Other objects of this invention will appear in the following description and appended claims, reference being had to the accompanying drawings forming a part of this specification wherein like reference characters designate corresponding parts in the several views.

Fig. 1 is a perspective view, partly in section and partly broken away, of a portion of an apparatus for carrying out the present invention in accordance with certain embodiments thereof.

Figs. 2 and 3 are views, similar to Fig. 1, illustrating the remaining principal portions of the apparatus.

Fig. 4 is a diagrammatic view, partly in section and partly broken away, illustrating the steps of the process which may be carried out by the apparatus of Figs. 1 to 3 inclusive.

Figs. 5 and 6 are diagrammatic views, partly in section and partly broken away, illustrating an apparatus and also the steps of a method in accordance with another embodiment of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to Figs. 1 to 4 inclusive, the apparatus therein illustrated, by way of example, is adapted to be utilized for the purpose of carrying out the present method in accordance with certain embodiments thereof. This apparatus comprises spaced longitudinally extending side frames 10 supported upon a suitable base or bed. An endless conveyor belt 11 travels between the side frames and is supported upon suitable guide rollers 12 extending between and carried by the frames 10, the conveyor belt being driven in any suitable manner at proper speed. Mounted upon the side frames 10 adjacent the front end of the conveyor are upstanding brackets 13 which revolubly support a roll 14 of sheet material 15 to be treated in accordance with the present invention. The sheet material 15 is preferably of a fibrous nature and in the present embodiment to be described is unpigmented. As an example of a suitable sheet material to be treated I may use alpha bleached sulphite wood pulp paper or equivalent paper having the desired thickness containing a reinforcing fibrous filler. The sheet material 15 is fed from the roll 14 onto the conveyor 11 and thence to a printing unit adapted to apply a suitable design or pattern continuously on the upper surface of the sheet as it is fed forwardly on the conveyor. This printing unit is carried by spaced brackets 16 mounted on the side frames 10 and may comprise a conventional set of offset printing rolls. In the present instance the printing unit comprises an ink trough 17 at the upper ends of the brackets 16, this trough adapted to contain the printing ink which is pigmented to provide an ornamental design of the desired color. The printing ink from the trough 17 is fed to an ink feeding roller 18 rotatably supported on the brackets 16. The ink from the roller 18 is transferred by contact to a copper engraved design or printing roller 19. The inked design on the roller 19 is transferred to an applicator or transfer roll 20 which may be of the usual gelatin or rubber covered type and which is adapted to transfer the inked design to the sheet 15 as it travels beneath the roller 20 and in contact therewith. It will be understood that the several rollers of the printing unit may be driven in any suitable manner and that this unit may be of conventional type for applying continuously any desired pattern or design to the moving sheet 15. In the present instance the printing unit is adapted to apply a wood grain pattern 21 to the sheet.

After the sheet 15 emerges from the printing unit which applies the inked design or pattern thereto, it is fed on the conveyor 11 beneath a drying unit which is adapted to subject the sheet to sufficient penetrating heat to dry the ink of the pattern or design. The drying of the inked pattern may be accomplished in various ways but I prefer to subject the sheet to penetrating heat produced by radiant energy from a source of infra-red rays or electronic heating in order to produce rapid and thorough drying of the inked pattern. In the present instance this is accomplished by means of a heating unit 22 comprising a hood or reflector 23 carrying a suitable number of lamps 24 energized to direct infra-red heating rays upon the entire surface of the printed sheet as it travels beneath the unit. When the sheet emerges from beneath this heating unit the inked pattern is thoroughly and completely dried.

In accordance with the next step of the process the printed sheet 15 is fed into a tank or container 25 containing a bath of liquid resin varnish. In the present instance the resin varnish within the tank 25 is clear or substantially colorless. The sheet is guided through the tank by means of guide rollers 26 and is completely immersed in the bath of resin varnish so as to apply a coating of this material upon opposite sides of the sheet which covers the printed pattern or design and also thoroughly impregnates or saturates the sheet with the resin. I prefer to use a suitable thermo-setting resin in the preparation of the bath, such as a phenol-formaldehyde resin, a urea formaldehyde resin, or a melamine resin with the resin in an intermediate stage of polymerization. The impregnated sheet as it emerges from the resin bath in the container 25 passes between squeegee rollers 27 which are adapted to remove excess liquid varnish from the surface of the sheet.

The coated and impregnated sheet passes from the tank 25 and the squeegee rollers 27 to a suitable endless conveyor 28 supported upon guide rollers carried by the side frames 10. This conveyor feeds the sheet beneath a drying unit 29 which may also be a source of radiant energy, such as infra-red rays, similar to the drying unit 22. The rays emitted from the lamp unit 29 penetrate the sheet and thoroughly dry the resinous coating thereon. From the drying unit 29 the sheet is carried by the conveyor 28 beneath a friction pressure roller 30 which in cooperation with the conveyor belt is adapted to grip the sheet somewhat and exert a pulling action thereon effective to assist the feeding action of the conveyor. This roller 30 is driven in any suitable manner and at the proper speed to maintain the sheet taut as it travels on the upper run of the conveyor 28. The roller also serves the purpose of assisting in feeding the sheet to a shearing unit 31 which carries a cutting knife or blade adapted to sever the sheet into blanks 32 of proper size. The blanks which are cut from the sheet by the shearing unit 31 are stacked upon a table or platform 33 positioned beyond the end of the conveyor 28. It will be understood that the length of the blank to be severed from the sheet will be predetermined by timing the cut-off mechanism or shearing unit 31 so as to synchronize with the speed of the conveyor and also the gripping roller 30. These, of course, will also be synchronized with the conveyor 11 and the offset printing rolls.

At 34 there is illustrated a suitable press carrying a lower die 34a and an upper die 34b adapted to cooperate therewith to preform the blanks 32. The upper die is carried by the usual vertically reciprocating ram of the press and this press may be either mechanically or hydraulically operated. The dies 34a and 34b are preferably unheated and are adapted to impart an initial shape or form to the blank approaching the final shape or form thereof. The blanks 32 are successively fed into the press 34 which is operated to successively preform the blanks and thereafter the preformed blanks 35 are deposited upon an endless conveyor 36 supported upon guide rollers 37 and driven at proper speed in any conventional manner.

The preformed blanks 35 are carried by the conveyor 36 beneath a heating unit which preferably comprises a source of penetrating heat rays capable of partially polymerizing the resin in the sheet so as to bring it up to approximately molding temperature. Either electronic heating may be used for this purpose or heat produced by radiant energy from a source of infra-red rays. In the present instance the heating unit 38 is similar to the units 22 and 29 comprising a battery of infra-red lamps adapted to emit penetrating rays of sufficiently greater intensity to bring the resin in the blanks to approximately molding temperature while also carrying forward the polymerization of the resin. The blanks may attain a temperature of from 250° F. to 300° F. as a result of the action of the heating unit 38. When the blanks emerge from beneath the heating unit 38 and at the end of the conveyor 36, they are immediately introduced in succession into a press 39 which is adapted to finally form the blanks under heat and pressure.

The press 39 is of generally conventional construction having a lower heated die or platen 39a and an upper heated die or platen 39b carried by a vertically reciprocable ram. The press may be either mechanically operated or hydraulically operated and the dies 39a and 39b cooperate to press the preformed blank 35 into final shape under predetermined pressure which is maintained a sufficient interval of time to enable the heat from the dies to penetrate the blank and complete the polymerization of the resin therein. The polymerizing temperature produced by the heated dies 39a and 39b may be on the order of from 275° F. to 300° F. and the required pressure is used during this final forming operation such as pressures ranging from 250 to 500 pounds per square inch.

The preforming operation carried out in the press 34 is preferably accomplished under lower pressures than the final forming operation in the press 39. The preforming dies 34a and 34b may be maintained at substantially room temperature or if desired they may be heated to an annealing temperature less than the temperature necessary to cause any substantial polymerization of the blank during the preforming operation. The preformed blank, however, is brought up to substantially or approximately molding temperature as it passes beneath the infra-red lamp unit 38 so that the blank, when it emerges from beneath this heating unit, will be heated to a point very nearly the temperature of the dies 39a and 39b. By virtue of this method it is possible to speed up the production, increase the output of the apparatus and also produce formed or molded articles of considerably better quality. After the final forming operation in the press 39 the finished blanks or articles 40 are transferred to a conveyor 41 which carries them to a suitable delivery station or to any point where further operations are to be carried out.

In addition to the foregoing method or process, carried out by the apparatus illustrated in Figs. 1 to 4 inclusive, the following modified method or process may also be performed by the same apparatus. The roll 14 may carry a sheet of paper or thin board stock comprising a reinforcing fibrous filler or binder and a thermo-setting resin, such as the resin hereinbefore described. This resin preferably has a pigment incorporated therein in order to provide a basic or ground color to the sheet. The resin in the sheet is in an intermediate stage of reaction or polymerization, such being commonly known as the B-stage, and this sheet is fed from the roll 14 on the conveyor 11 to the offset printing unit 17—20 which applies the inked design or pattern thereto, such as the wood grain pattern 21. The pigment incorporated in the ink preferably affords a contrasting color to the ground color of the sheet. After emerging from the printing unit the inked pattern or design is dried by means of the infra-red drying unit 22 and thence the sheet is fed by the conveyor into the tank 25 which contains a bath of clear or transparent liquid resin varnish. As in the previous embodiment, the resin of this bath is of the thermo-setting type, similar to or compatible with the resin which forms a constituent of the resinous sheet carried by the roll 14. By immersing the sheet in the bath contained in the tank 25 a coating of clear resin is applied to the sheet and from this tank the sheet passes through the squeegee rollers 27 and thence is fed on the conveyor 28 beneath the drying lamp unit 29 which functions to dry the resinous coating applied to the sheet in the tank 25. Thus, the inked design or pattern on the sheet is completely covered by a coating of transparent resin similar to the resin in the sheet. After the sheet has been dried by the lamp unit 29, it passes beneath the feed roller 30 and is cut into blanks 32 by the shearing unit 31. From this point the blanks 32 are processed in a manner similar to that described above in connection with the previous embodiment. As therein described, the blanks are preformed in the press 34 and thence conveyed in succession on the conveyor 36 beneath the heating unit 38 which brings the resin in the sheet as well as in the resin coating covering the printed design to approximately molding temperature. After leaving the conveyor 36 the blanks are finally formed in the press 39 under heat and pressure which not only molds or forms the blanks to final shape but also completes the polymerization of the resin in the body of the sheet as well as in the coating applied thereto in the tank 25.

The clear or transparent resinous coating, which is applied to the sheet over the printed design, not only has the advantage of protecting the design or pattern against marring or defacement in use but also stabilizes the inked pattern to the extent of preventing the resin in the body of the sheet from being forced through or around the printing tending to distort or obliterate it while the blanks are being finally formed in the press 39. It will be understood that during operation of the heated dies of the press 39 on the blanks there is a tendency for the resin in the body of the sheet to flow toward the surface of the sheet. However, by superimposing the clear resinous coating on the printed sheet the design or pattern is, in effect, anchored in place and this coating prevents the flow of the resin in the sheet through and around the printing and the consequent distortion or blurring thereof.

It will be understood that any combination of colors may be utilized in connection with the pigmentation of the resinous sheet on the roll 14 and the printing ink used in connection with the pattern or design applied to the sheet. Ordinarily the basic color will be incorporated in the sheet carried by the roll 14 and any contrasting color may be used in connection with the printing ink used in applying the design or pattern to the sheet. A further combination effect may be produced by pigmenting the resin varnish in the tank 25 which is utilized to apply a thin continuous coating over the inked design or pattern and through which coating the pattern is visible or revealed.

With reference to the embodiment illustrated in Figs. 5 and 6, the apparatus in this instance also comprises suitable longitudinally extending spaced supporting side frames 42. An endless conveyor 43 is mounted through the medium of guide rollers at the front end of the side frames, the conveyor being driven in any suitable manner and properly timed for conducting a continuous sheet 45 from a roll 44 to a tank 46 supported by the side frames. The sheet material 45 carried on the roll 44 may be unpigmented and of fibrous stock similar to that described in connection with the first embodiment. The sheet 45 as it passes through the tank 46 is entirely immersed in a bath 47 containing a pigmented thermo-setting resin, such as the resin mentioned above. This resinous varnish 47 is pigmented to provide the basic color for the finally formed blanks and as the sheet passes through the resinous bath 47 it is impregnated or saturated with the resin to the extent that the sheet, as it emerges from the bath and after passing through the squeegee rolls 48, will contain preferably approximately thirty to forty percent of resin by weight. The resin impregnated sheet then passes onto a moving endless conveyor 49 and is conducted thereby beneath a drying unit 51, which may be similar to the unit 22 above described. The sheet is preferably dried by the heating unit 51 at a temperature insufficient to effect any material polymerization of the resin in the sheet, a suitable temperature for the drying operation being between 150° F. and 250° F. The sheet is not only dried by the heating unit 51 but, in addition, moisture, gases and volatiles are also eliminated.

The sheet 45 passes from the drying unit 51 on the conveyor 49 beneath an offset printing unit 52 which may be similar to that previously described and the sheet is printed with a design or pattern, such as the wood graining 21. With this printing unit the design or pattern is preferably applied utilizing a colored or pigmented ink which will have a different color than the basic color used in the resin bath 47. Passing from the offset printing unit 52 the sheet travels on the conveyor beneath a heating unit 53 which may be similar to the unit 22 previously described and the inked pattern or design is dried. Continued travel of the sheet on the conveyor 49 will cause it to be fed beneath a spray gun or nozzle unit 54 carrying a battery of nozzles or jets 55 adapted to spray a thin coating of resin varnish entirely over the surface of the sheet and thus completely cover the printed design or pattern. The resin varnish used for the purposes of this coating is preferably clear or transparent and is composed principally of a thermo-setting resin similar to or compatible with the resin used in the resinous bath 47.

Further travel of the sheet on the conveyor 49 will cause it to pass beneath a drying unit 56 which functions similar to the unit 29 to dry the resin coating applied to the sheet by the spray gun unit 54. The coated sheet thereupon passes on the conveyor 49 beneath the friction feed roller 30 and the sheet is cut into blanks 59 of suitable size by the shearing unit 57, the construction of which is similar to the unit 31 previously described. The blanks 59 after leaving the conveyor 49 are stacked on a table or platform 58 preparatory to the preforming operation carried out in the press 60. The preforming of the blanks is accomplished in the same manner as described in connection with the operation of the press 34. The blanks are preformed in the press under lower pressure than used in the final forming operation and the preforming dies may be either maintained at substantially room temperature or may be heated to a temperature lower than that necessary to effect any material polymerization of the resin in the sheet or in the coating on the sheet.

The preformed blanks 61 are transferred from the press 60 to an endless conveyor 62 which feeds the blanks at a predetermined rate of speed beneath a heating unit 63 which may be similar to the heating unit 38 previously described. This heating unit subjects the blanks to penetrating heat and brings them to approximately molding temperature, such as a temperature between 275° F. and 300° F. At the end of the conveyor 62 the blanks are successively fed to a press 64, similar to the press 39, which finally molds or forms the blanks under heat and pressure. The finally formed blanks 65 are transferred from the press to a conveyor 66 which conducts them successively to a delivery station or other point where succeeding operations may be carried out on the blanks or articles 65.

It will be understood that variations in the sequence of steps of the method may be made without departing from the spirit and scope of the invention. For example, where the shape of the article permits and depending upon the nature and location of the pattern applied to the article, the following change in the sequence of steps may be made. Referring to Fig. 5, after the coating on the sheet has been dried by the drying unit 51, the sheet may then be sheared into blanks 59 by the shearing or blanking unit 57. Thereafter the blanks may be preformed in the press 60 as previously described. The preformed blanks may then be printed by unit 52, the ink of the printed design dried by unit 53, a clear or transparent resinous coating applied by the spray unit 54, then dried by the unit 56, after which the preformed blanks 61 may be carried by the conveyor 62 beneath the polymerizing heating unit 63 and thence into the press 64 for the final molding or forming operation.

Any suitable or desired plastic article 65 may be made in accordance with the present invention such, for example, as the instrument panel of an automobile body or airplane. In cases where the article has sharp bends at certain localities or requires a relatively deep draw in the press, I have found it advantageous to first soak in warm water such areas of the blank where these sharp bends or deep draws are necessitated. Thereafter the preforming step may be carried out without danger of cracking or splitting the blank at such areas.

Thus, in accordance with one important feature of the invention a sheet of fibrous stock is printed with a suitable pattern or design, dried and then immersed or otherwise coated with a thermosetting resin in the intermediate stage which completely covers the printing and penetrates the sheet. This resin may be either colorless or pigmented but is sufficiently transparent to permit the pattern or design to show through the covering film of resin. The resin coating fixes the pattern in place and assists materially in preventing distortion or "running" thereof during the final molding operation under heat and pressure.

Further, in accordance with another important feature of the invention a sheet of fibrous stock containing a thermo-setting resin in an intermediate stage is printed, dried and then coated with a clear or transparent thermo-setting resin in an intermediate stage. Thus, the sheet or blank before the final forming thereof comprises a base or foundation layer of resin and fibers in intimate relation, a layer comprising an inked pattern or design, and a layer or film of resin superimposed thereon. The thermo-setting resins in the top and bottom layers are similar or compatible. When, therefore, this laminated sheet is molded under heat and pressure, all of the resin will be polymerized to the final stage of reaction and, of course, the layers of resin will flow together and intimately mix and unite into a homogeneous layer. However, no appreciable disturbance or distortion of the intermediate printed design will occur as the layers of resin at opposite sides of the printing tend to bond the printing lines or characters in fixed position.

It will be understood that the sheet of fibrous stock may be impregnated or saturated with the resin either before or during the carrying out of the process and the printing may be applied either to a resinous fibrous sheet or to a fibrous sheet containing no resin. In any case, it is important that a layer or film of the resin completely cover the printing before the final polymerizing step by which all of the resin is converted or reacted to the final stage under heat and pressure.

Although in carrying out the present process it is preferred to conduct many of the steps on a continuous sheet of material, such as a cellulosic material containing a quantity of reinforcing fibers, it will be understood that all of the important steps of the process may be carried out in connection with blanks of the sheet material previously cut to size. Hence, unless specifically stated in the claims, it will be understood that the terms "sheet" or "blank" are to be construed interchangeably as referring to either a continuous sheet or parts or blanks of predetermined size.

I claim:

1. In the method of making plastic articles the steps of applying an inked design or pattern to the surface of a cellulosic sheet, drying the ink of said pattern, treating said sheet with a thermo-setting resin in an intermediate stage of polymerization to leave a film of said resin as a coating over said pattern, drying the sheet, preforming said sheet in a press to approximately the shape of the final article, removing the sheet from the press, heating the sheet, and finally forming the sheet in a second press by the simultaneous action of heat and pressure.

2. In the method of making plastic articles the steps of applying an inked design or pattern to the surface of a cellulosic sheet, drying the ink of said pattern, treating said sheet with a thermo-setting resin in an intermediate stage of polymerization to leave a film of said resin as a coating over said pattern, drying the sheet, preforming said sheet in a press under pressure to approximately the shape of the final article and in the absence of heat sufficient to cause any appreciable polymerization of the resin, heating the sheet to bring the resin therein to a temperature approximating molding temperature, and finally forming the sheet in a second press by the simultaneous action of heat and pressure.

3. In the method of making plastic articles the steps of applying an inked design or pattern to the surface of a cellulosic sheet, drying the ink of said pattern, treating said sheet with a thermo-setting resin in an intermediate stage of polymerization to leave a film of said resin as a coating over said pattern, heating the sheet to bring the same to a temperature approaching molding or polymerizing temperature, and then introducing the sheet into a press or mold while at substantially said temperature and subjecting the sheet in said press to heat at a higher temperature and also pressure to finally form the sheet and complete the polymerization of the resin.

4. In the method of making plastic articles the steps of applying an inked design to the surface of a sheet containing a polymerizable resin, drying the ink of the design, applying a polymerizable resinous film or layer over said design, preforming the sheet under pressure to approximately the shape of the final article and in the absence of heat sufficient to cause any appreciable flow of the resin, heating the resin of the sheet and film, and further forming the sheet under pressure and also heat sufficient to polymerize said resin.

5. In the method of making plastic articles the steps of applying an inked design to the surface of a sheet containing a polymerizable resin, drying the ink of the design, applying a polymerizable resinous film or layer over said design, pre-forming the sheet under pressure and in the absence of heat sufficient to cause any appreciable flow of the resin, heating the resin of the sheet and film with heat from a source of radiant energy, and further forming the sheet under pressure and also heat sufficient to polymerize said resin.

6. In the method of making plastic articles the steps of applying an inked design to the surface of a sheet containing a reactive resin, drying the ink of the design, spraying a liquid reactive resinous film or layer over said design, molding the sheet to partial shape in the absence of heat sufficient to cause any appreciable flow of the resin, and molding the sheet to final shape under pressure and heat sufficient to react the resin.

7. In the method of making plastic articles the steps of treating a sheet of fibrous material with a pigmented reactive thermo-setting resin of one color, printing a design on said sheet with ink pigmented to provide a contrasting color, covering the ink of said design with a transparent reactive resinous film, partially forming said sheet under pressure and at a temperature below the reactive temperature of the resin, and finally forming said sheet under pressure, and heat sufficient to react the resin.

8. In the method of making plastic articles the steps of treating a sheet of fibrous material with a pigmented reactive thermo-setting resin of one color, printing a design on said sheet with ink pigmented to provide a contrasting color, covering the ink of said design with a transparent reactive resinous film, partially forming said sheet under pressure and at a temperature below the reactive temperature of the resin, and molding said sheet to final form under heat sufficient to simultaneously react the resin of the sheet and film.

9. In the method of making plastic articles the steps of treating a sheet of fibrous material with a pigmented reactive thermo-setting resin of one color, printing a design on said sheet with ink pigmented to provide a contrasting color, covering the ink of said design with a transparent reactive resinous film, pre-forming the sheet under pressure at a temperature below the reactive temperature of the resin, heating the sheet, and molding the sheet while reacting the resin of the sheet and film.

10. In the method of making plastic articles, the steps of applying an inked design or pattern to the surface of a sheet of cellulosic material, coating said sheet with a liquid reactive resinous varnish to cover said design or pattern with a film, partially drying said film, forming said sheet in a press so as to mold the same to approximately the final shape of the article and at a temperature insufficient to cause any appreciable reaction of the resin, and thereafter completing the final forming of the article in a second press under pressure and heat sufficient to react the resin.

11. In the method of making plastic articles, the steps of applying an inked design or pattern to the surface of a sheet of cellulosic material, coating said sheet with a liquid reactive resinous varnish to cover said design or pattern with a film, partially drying said film, forming said sheet in a press so as to mold the same to approximately the final shape of the article and at a temperature insufficient to cause any appreciable reaction of the resin, heating said sheet to bring the temperature of the resin therein to approximate reactive temperature, and thereafter molding the sheet in a second press into final form while subjecting the sheet to the temperature of reaction of the resin.

12. In the method of making plastic articles the steps of applying an inked design to the surface of a sheet containing a polymerizable resin, drying the ink of the design, applying a polymerizable resinous film or layer over said design, pre-forming the sheet in a press under pressure to approximately the shape of the final article and in the absence of heat sufficient to cause any appreciable flow of the resin, and further forming the sheet in a second press under pressure and also heat sufficient to polymerize said resin.

ALVIN W. PRANCE.

---

Certificate of Correction

Patent No. 2,410,361.     October 29, 1946.

ALVIN W. PRANCE

It is hereby certified that errors appear in the printed specification of the above numbered patent requiring correction as follows: Column 12, lines 2 and 15, strike out "partially" and insert the same before "forming" in same lines; and that the said Letters Patent should be read with these corrections therein that the same may conform to the record of the case in the Patent Office.

Signed and sealed this 4th day of February, A. D. 1947.

[SEAL]

LESLIE FRAZER,
*First Assistant Commissioner of Patents.* steps of treating a sheet of fibrous material with a pigmented reactive thermo-setting resin of one color, printing a design on said sheet with ink pigmented to provide a contrasting color, covering the ink of said design with a transparent reactive resinous film, partially forming said sheet under pressure and at a temperature below the reactive temperature of the resin, and finally forming said sheet under pressure, and heat sufficient to react the resin.

8. In the method of making plastic articles the steps of treating a sheet of fibrous material with a pigmented reactive thermo-setting resin of one color, printing a design on said sheet with ink pigmented to provide a contrasting color, covering the ink of said design with a transparent reactive resinous film, partially forming said sheet under pressure and at a temperature below the reactive temperature of the resin, and molding said sheet to final form under heat sufficient to simultaneously react the resin of the sheet and film.

9. In the method of making plastic articles the steps of treating a sheet of fibrous material with a pigmented reactive thermo-setting resin of one color, printing a design on said sheet with ink pigmented to provide a contrasting color, covering the ink of said design with a transparent reactive resinous film, pre-forming the sheet under pressure at a temperature below the reactive temperature of the resin, heating the sheet, and molding the sheet while reacting the resin of the sheet and film.

10. In the method of making plastic articles, the steps of applying an inked design or pattern to the surface of a sheet of cellulosic material, coating said sheet with a liquid reactive resinous varnish to cover said design or pattern with a film, partially drying said film, forming said sheet in a press so as to mold the same to approximately the final shape of the article and at a temperature insufficient to cause any appreciable reaction of the resin, and thereafter completing the final forming of the article in a second press under pressure and heat sufficient to react the resin.

11. In the method of making plastic articles, the steps of applying an inked design or pattern to the surface of a sheet of cellulosic material, coating said sheet with a liquid reactive resinous varnish to cover said design or pattern with a film, partially drying said film, forming said sheet in a press so as to mold the same to approximately the final shape of the article and at a temperature insufficient to cause any appreciable reaction of the resin, heating said sheet to bring the temperature of the resin therein to approximate reactive temperature, and thereafter molding the sheet in a second press into final form while subjecting the sheet to the temperature of reaction of the resin.

12. In the method of making plastic articles the steps of applying an inked design to the surface of a sheet containing a polymerizable resin, drying the ink of the design, applying a polymerizable resinous film or layer over said design, pre-forming the sheet in a press under pressure to approximately the shape of the final article and in the absence of heat sufficient to cause any appreciable flow of the resin, and further forming the sheet in a second press under pressure and also heat sufficient to polymerize said resin.

ALVIN W. PRANCE.

---

Certificate of Correction

Patent No. 2,410,361.     October 29, 1946.

ALVIN W. PRANCE

It is hereby certified that errors appear in the printed specification of the above numbered patent requiring correction as follows: Column 12, lines 2 and 15, strike out "partially" and insert the same before "forming" in same lines; and that the said Letters Patent should be read with these corrections therein that the same may conform to the record of the case in the Patent Office.

Signed and sealed this 4th day of February, A. D. 1947.

[SEAL]

LESLIE FRAZER,
*First Assistant Commissioner of Patents.*